US006332150B1

(12) United States Patent
Khan et al.

(10) Patent No.: US 6,332,150 B1
(45) Date of Patent: *Dec. 18, 2001

(54) INTEGRATED DOCUMENT DEVELOPMENT METHOD

(75) Inventors: Azhar H. Khan; James G. Stiefel; Zaitrarrio T. Collier, all of San Francisco, CA (US); Benjamin J. Lee, Colonial Heights, VA (US)

(73) Assignee: Cubus Corporation, San Francisco, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 09/144,363

(22) Filed: Aug. 31, 1998

(51) Int. Cl.[7] ............................. G06F 15/00; G06F 17/00
(52) U.S. Cl. ............................. 707/526; 707/517
(58) Field of Search ............................. 707/500, 501, 707/515, 513, 520, 530, 531, 526; 345/302, 118, 123, 135, 141, 330, 331, 332–333, 340–341, 345–347

(56) References Cited

U.S. PATENT DOCUMENTS

| 3,920,895 | 11/1975 | Vieri et al. . |
| 3,920,896 | 11/1975 | Bishop et al. . |

(List continued on next page.)

OTHER PUBLICATIONS

Gralla, Preston, How the Internet Works, Special Edition, Ziff–Davis Press, pp. 144–147, 183.

McFedries, Paul, Paul McFedries' Windows 95 Unleashed, Premiere Edition, Sams Publishing, pp. 154–155, 158, 192, 209, 330–331, 333, 335–336, 339, 355, 498, 1002, 1138–1139, 1179–1180.

Dick Oliver, et al., Netscape Unleashed, Sams Net, pp. 176, 238, 266, and 433, Feb. 1996.*

Brown, Mark R., Using Netscape™ 2, Que Corporation, 1995, Chap. 30, pp. 780–785.

Creative Partner™ by emotion™, User's Guide, 1994, Chap. 1, pp. 1–5 and Chap. 6, pp. 45–53.

*Primary Examiner*—Hosain T. Alam
*Assistant Examiner*—Alford W. Kindred
(74) *Attorney, Agent, or Firm*—Townsend and Townsend and Crew LLP

(57) ABSTRACT

A method for developing documents which allows simultaneously displaying the document being developed, changes to the document and a history of changes made during development. The method is practiced on a computer system of the type having a processor, a display and a memory in data communication with both the processor and the display. The method includes the steps of segmenting the display into a plurality of regions, displaying, in one of the regions, a document file having viewable information associated therewith, displaying, in a second of the regions, a message file, displaying, in a third of the regions, a plurality of message headers, with a subset of the message headers providing a summary of content in the message file and the message file providing a description of a subportion of the viewable information.

38 Claims, 12 Drawing Sheets

Microfiche Appendix Included
(2 Microfiche, 182 Pages)

U.S. PATENT DOCUMENTS

| | | | |
|---|---|---|---|
| 5,008,853 | * 4/1991 | Bly et al. | 364/900 |
| 5,129,082 | 7/1992 | Tirfing et al. | 707/3 |
| 5,146,552 | 9/1992 | Cassorla et al. | |
| 5,204,947 | 4/1993 | Bernstein et al. | |
| 5,321,505 | 6/1994 | Leddy . | |
| 5,341,469 | 8/1994 | Rossberg et al. | 707/514 |
| 5,515,491 | 5/1996 | Bates et al. | |
| 5,539,871 | 7/1996 | Gibson . | |
| 5,596,700 | 1/1997 | Darnell et al. | |
| 5,596,705 | 1/1997 | Reimer et al. | |
| 5,669,005 | 9/1997 | Curbow et al. | |
| 5,694,544 | 12/1997 | Tanigawa et al. | |
| 5,706,452 | 1/1998 | Ivanov . | |
| 5,706,502 | * 1/1998 | Foley et al. | 707/10 |
| 5,708,826 | 1/1998 | Ikeda et al. | |
| 5,708,845 | 1/1998 | Wistendahl et al. | |
| 5,740,444 | 4/1998 | Frid-Nielsen | 395/705 |
| 5,758,313 | 5/1998 | Shah et al. | 455/456 |
| 5,761,419 | * 6/1998 | Schwartz et al. | 709/204 |
| 5,761,499 | 6/1998 | Sonderegger | 707/10 |
| 5,781,732 | 7/1998 | Adams | 395/200 |
| 5,799,191 | 8/1998 | Moriyasu et al. | |
| 5,801,702 | 9/1998 | Dolan et al. | 395/161 |
| 5,809,512 | 9/1998 | Kato | 707/502 |
| 5,860,073 | 1/1999 | Ferrel et al. | 707/522 |
| 5,864,870 | 1/1999 | Guck | 707/104 |
| 5,870,754 | 2/1999 | Dimitrova et al. | 707/104 |
| 5,878,421 | 3/1999 | Ferrel et al. | 707/100 |
| 5,893,126 | 4/1999 | Drews et al. | 707/512 |
| 5,911,776 | 6/1999 | Guck | 709/217 |
| 5,931,906 | 8/1999 | Fidelibus, Jr. et al. | 709/217 |
| 5,938,724 | * 8/1999 | Pommier et al. | 709/205 |
| 5,944,785 | * 8/1999 | Pommier et al. | 709/205 |
| 5,949,413 | 9/1999 | Lerissa et al. | 345/330 |
| 5,956,736 | 9/1999 | Hanson et al. | 707/513 |
| 5,958,006 | 9/1999 | Eggleston et al. | 709/219 |
| 5,978,836 | 11/1999 | Ouchi | 709/206 |
| 5,987,469 | 11/1999 | Lewis et al. | 707/102 |
| 6,014,135 | 1/2000 | Fernandes | 345/331 |
| 6,067,551 | 5/2000 | Brown et al. | 707/203 |
| 6,158,903 | 12/2000 | Schaeffer et al. | 395/200 |

* cited by examiner

INTEGRATED DOCUMENT DEVELOPMENT METHOD

This application includes a microfiche appendix consisting of 182 frames on two sheets containing source code listings that list instructions for a process by which the present invention is practiced in a computer system.

A portion of the disclosure recited in the specification contains material which is subject to copyright protection. The copyright owner has no objection to the facsimile reproduction of the specification as filed in the Patent and Trademark Office. Otherwise all copyright rights are reserved.

BACKGROUND OF THE INVENTION

The present invention relates to programmable computer systems. More particularly, the present invention is directed to a method suited for dynamic design collaboration over a data network.

The evolution of many documents, such as architectural specifications, books, legal papers and other lengthy manuscripts may involve multiple iterations or contributions from multiple developers or both. During the evolution of the aforementioned documents, difficulties may arise with management and organization of the various changes made thereto. For example, it may be difficult to determine the developer who provides a contribution or which contribution may be attributed to any given developer. To that end, many document organizational techniques have been developed throughout history to manage and control the development of documents. A rudimentary management technique requires changes to be made directly to the document itself. The document, however, may quickly become unintelligible after many iterations by a single developer or through fewer iterations by multiple developers. In addition, many developers must be centrally located to make changes to the document, or the same copy of the document must be distributed to the many developers, both of which may prove inconvenient and time consuming.

The advent of copy machines facilitated development of a single iteration of a document by providing multiple copies of the same, which are then transmitted to multiple developers. Modem communication has substantially reduced the transmission time of a copy of a document under development to developers from a copy center and has practically abrogated the need for developers to meet at a centralized location. Management of multiple copies, each of which has differing changes to the same iteration of a document, is often cumbersome, time-consuming and inefficient. Computer technology has contributed to a reduction in many of the drawbacks involved with handling several copies of a document under development.

In U.S. Pat. No. 5,341,469, for example, a computer system is employed to generate finished project plans and specifications for constructing a building, which includes a master specification and standardized information embedded in other documents. The system uses keynote references that are inserted into other documents, such as drawings produced by a CAD system, to construct a partial project knowledge base. The knowledge base is then used to guide the editing of a master specification to yield initial project plans and specifications. The keynote references are found in a catalog of standardized notes and are arranged to be searched by their attributes, using an interactive index utility. The keynote references are included on the CAD drawings, or like computer readable documents, from which they may be extracted for later use in constructing or updating a project knowledge base. The system provides a human interactive editing program that is used to augment, through questions and answers, the project knowledge base with information not present in the referenced keynote. Finally, the master specification is edited using the information in the project knowledge base to yield the finished project specification in the form of a set of document files which are then edited to form a final plans and specifications for project construction.

Management of document development has been further aided by recent development of data networks, such as the "Internet". The Internet typically includes a plurality of users employing client terminals communicating with a remote server computer to transfer information therebetween. To facilitate the transfer, the client terminals have a "web" browser that provides graphical user interface (GUI)-based communication with a "web page" obtained from a server. One popular collection of servers uses a standardized Hypertext Transfer Protocol (HTTP) to provide information and is known as the "World Wide Web." The information is typically presented as web pages written as text with standardized formatting and control symbols known as Hypertext Mark-up Language (HTML). HTML provides basic document formatting and allows a server to specify "links" to other servers and files. Use of an HTML-compliant browser involves specification of a link via a Uniform Resource Locator (URL). Upon such specification, the user's client terminal makes a TCP/IP request to the server identified in the link and receives an HTML file that is interpreted by the browser so that a electronic HTML document made up of one or more web pages may be displayed on the client's terminal.

What is needed, however, is an integrated document development method and system that facilitates dynamic design collaboration by multiple developers over a data network.

SUMMARY OF THE INVENTION

The present invention provides a method for developing documents which allows simultaneously displaying the document being developed, changes to the document and a history of changes made to the document. The method is practiced on a computer system of the type having a processor, a display and a memory in data communication with both the processor and the display. The method includes the steps of segmenting the display into a plurality of regions, displaying, in one of the regions, a document file having viewable information associated therewith, displaying, in a second of the regions, a message file; and displaying, in a third of the regions, a plurality of message headers, with a subset of the message headers providing a summary of content in the message file and the message file providing a description of a subportion of the viewable information.

A subportion of the plurality of message headers provide a summary of content of differing message files and a varying step is implemented which varies the subportion of the viewable information by displaying one of the differing message files. A tool palette and a cursor are present on the display, with the tool palette being positioned in a fourth region of thereof. The tool palette has one or more tool-defining regions. Each tool-defining region specifies a predetermined operation that modifies a subportion of the viewable information, defining an annotation. The annotation typically includes formation of a line on the document file and may have any one of various shapes, such as an ellipse, a circle or a polyhedron. The content of the message file includes data corresponding to the annotation.

The document file and the message file may be any type of computer readable file. Examples of the documents file includes vector-based files, character based files and graphics files. The message file may consist of any of the aforementioned files, as well as an audio file or video streams. In a preferred embodiment, the method and system are employed over a data network, such as a local area network, a wide-area data network, e.g., the Internet and the like.

DETAILED DESCRIPTION OF THE PREFERRED EMBODIMENTS

Figure 1:
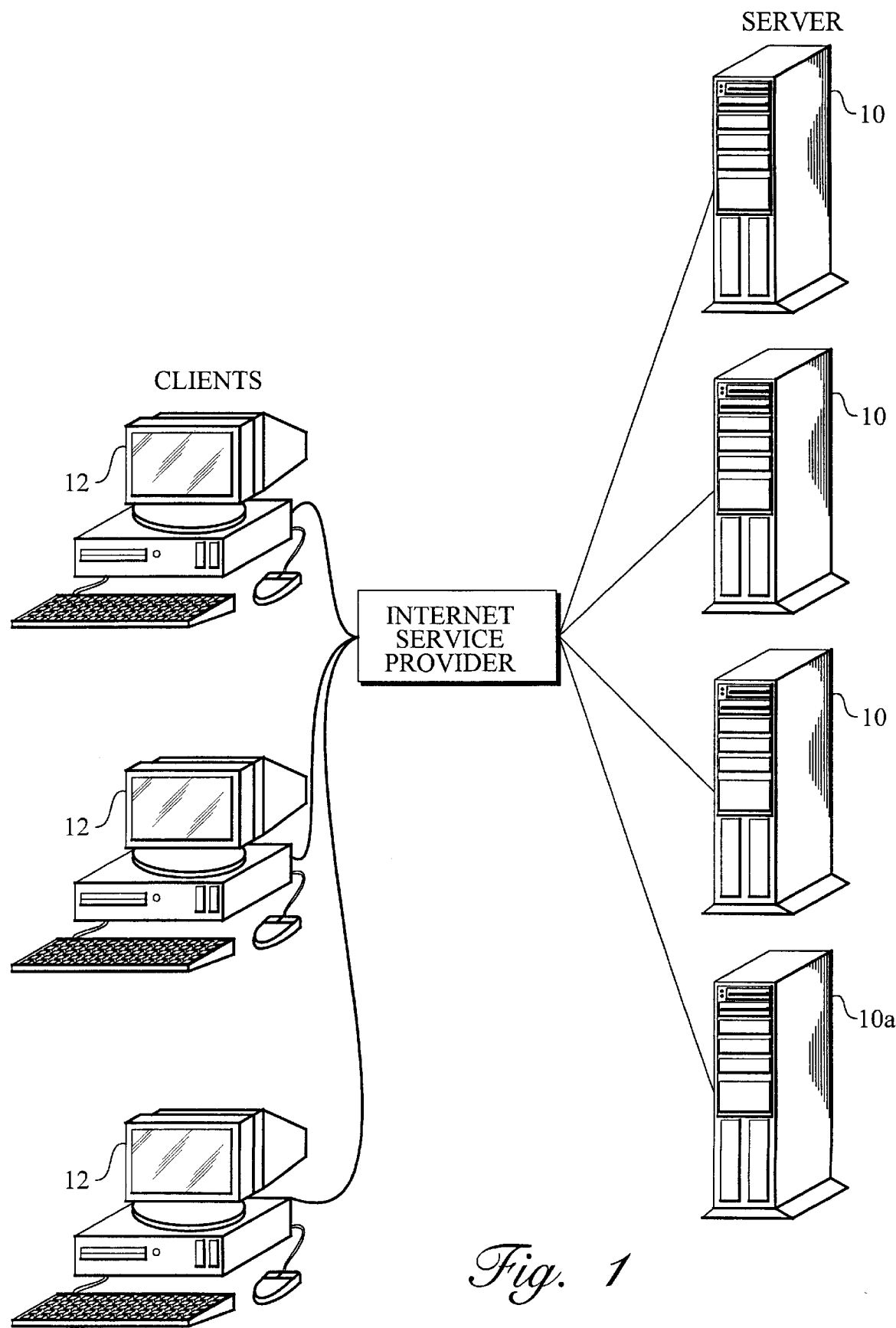
FIG. 1 is simplified plan view of a computer network in which the present invention is implemented.

Referring to FIG. 1, a large area network is shown, such as the Internet, which includes a plurality of networked "servers" 10 that are accessible by "client terminals" 12. Communication between the servers 10 and the client terminals 12 typically occurs over a publicly accessible network, such as a public switched telephone network over ASDL telephone lines or large bandwidth trunks, such as T1 or OC3 service. The client terminals 12 access the various servers 10 through an Internet service provider, e.g., America On-Line, Prodigy, CompuServe and the like, by executing application specific software, commonly referred to as a "browser", on a computer 14, shown more clearly in FIG. 2.

Figure 2:
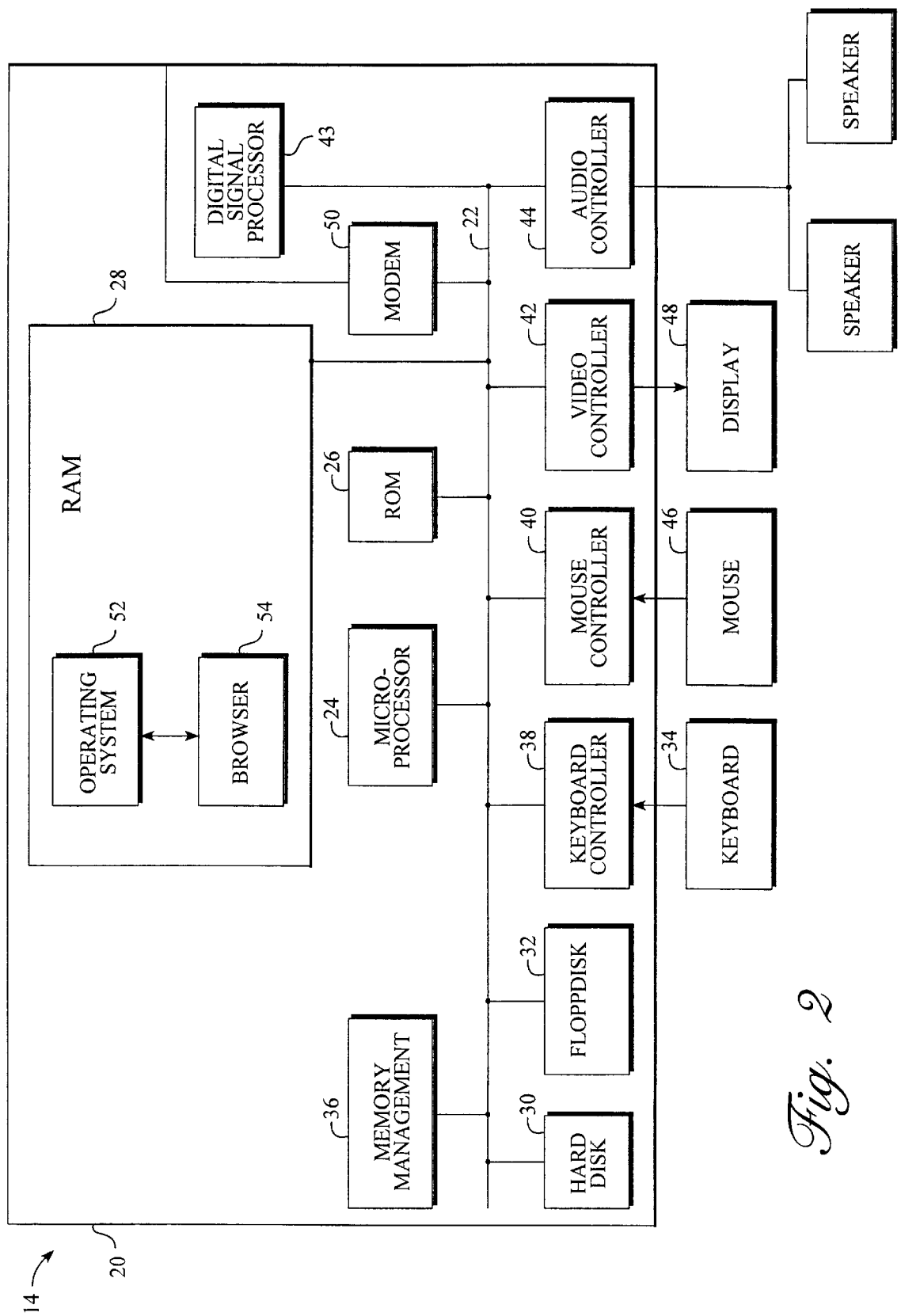
FIG. 2 is a block diagram of a client terminal shown above in FIG. 2.

Referring to FIG. 2, the computer 14 includes a system unit 20 having one or more system buses 22 placing various components of the system in data communication. For example, a microprocessor 24 is placed in data communication with both a read only memory (ROM) 26 and random access memory (RAM) 28 via the system bus 22. The ROM 26 contains among other code, the Basic Input-Output system (BIOS) which controls basic hardware operation such as the interaction with peripheral components such as disk drives 30 and 32, as well as the keyboard 34. The RAM 28 is the main memory into which the operating system and application programs are loaded and affords at least 32 megabytes of memory space. The memory management chip 36 is in data communication with the system bus 22 to control direct memory access (DMA) operations. DMA operations include passing data between the RAM 28 and the hard disk drive 30 and the floppy disk drive 32. Also in data communication with the system bus 22 are various I/O controllers: a keyboard controller 38, a mouse controller 40, a video controller 42, and an audio controller 44. The keyboard controller 38 provides a hardware interface for the keyboard 36, the mouse controller 40 provides the hardware interface for a mouse 46, or other point and click device, and the video controller 40 provides a hardware interface for a display 48. A modem 50 enables data communication over the network facilitating data transmission speeds of at least 28.8 kilobytes per second. The operating system 52 of the computer 14 may be DOS, WINDOWS 3.x, WINDOWS 95, OS/2, or other known operating system. Preferably, the operating system is WINDOWS NT 4.0 or WINDOWS 95. The RAM 28 also supports a number of Internet access tools, including, for example, an HTTP-compliant web browser having a JavaScript interpreter, such as Netscape Navigator 3.0, Microsoft Explorer 3.0 and the like.

Referring to both FIGS. 1 and 2, the integrated development system and method is accessed over the Internet. The browser 54 employs a TCP/IP connection to pass a request to a server 10 running an HTTP "service" (under the WINDOWS operating system) or a "daemon" under the UNIX operating system. The request is typically achieved by contacting an HTTP server 10 at the following address "http://www.cubus.net," employing a protocol that can be used to communicate between the server 10 and the client terminal 12. The HTTP server 10 then responds to the protocol, typically by sending a "web page" formatted as an HTML file. The browser 54 interprets the HTML file and may form a visual representation of the same using local resources, e.g., fonts and colors.

Figure 3:
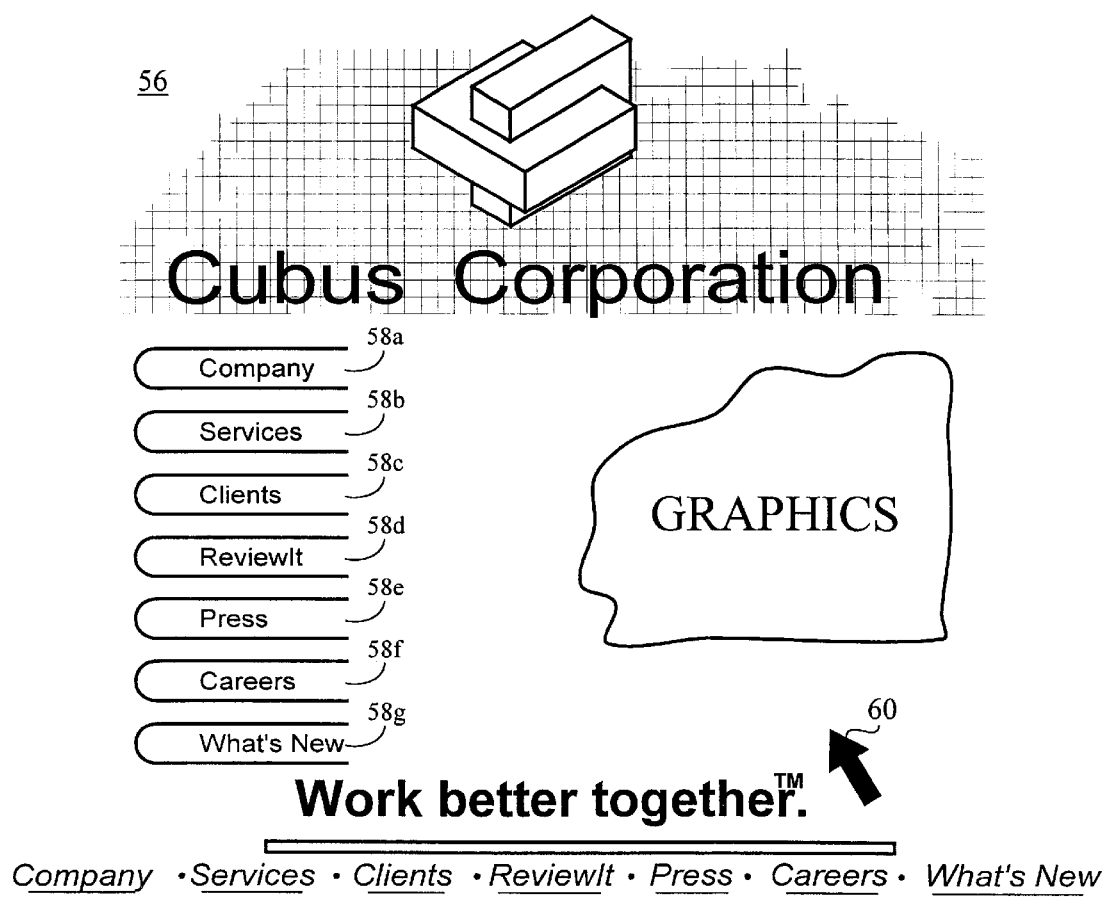
FIG. 3 is a plan view of a web page having a visual representation of a hypertext link employed to access the present invention.
Figure 4:
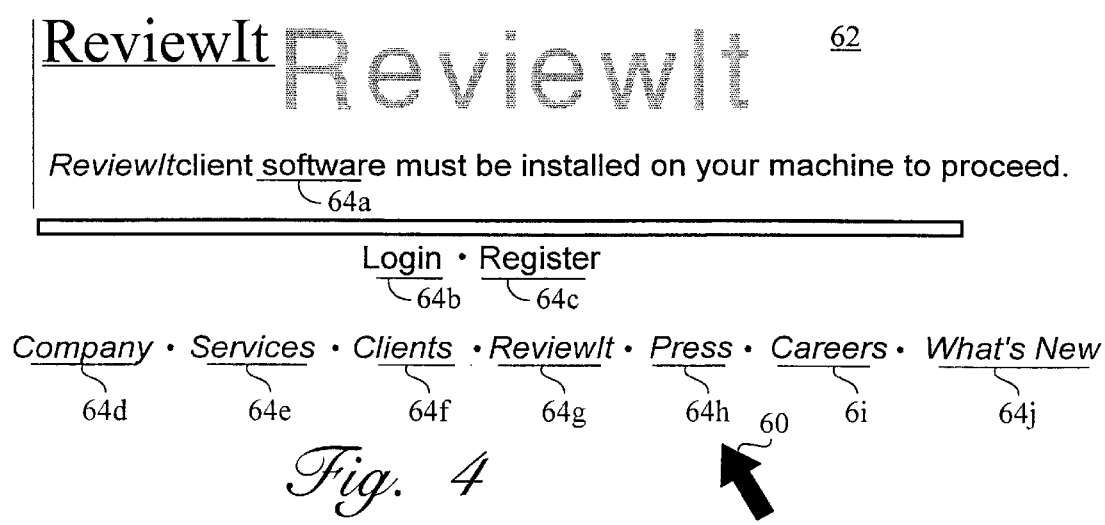
FIG. 4 is a plan view of a second web page having a visual representation of a hypertext link employed to access the present invention.

Referring to FIGS. 2 and 3, the "web page" 56 displayed at the aforementioned address includes, inter alia, a plurality of hypertext links, shown generally as 58a–g. Employing the mouse 46, a cursor 60 may be placed proximate to hypertext link 58d, entitled ReviewIt™ and a cursor event is effectuated which connects to web page 62, shown in FIG. 4. Web page 62 includes a plurality of hypertext links 64a–i. Hypertext link 64a allows downloading of the requisite ReviewIt™ software to interact with the server to practice the present invention. Hypertext link 64b is activated to practice the present invention once the requisite software is loaded onto the client terminal.

Figure 5:
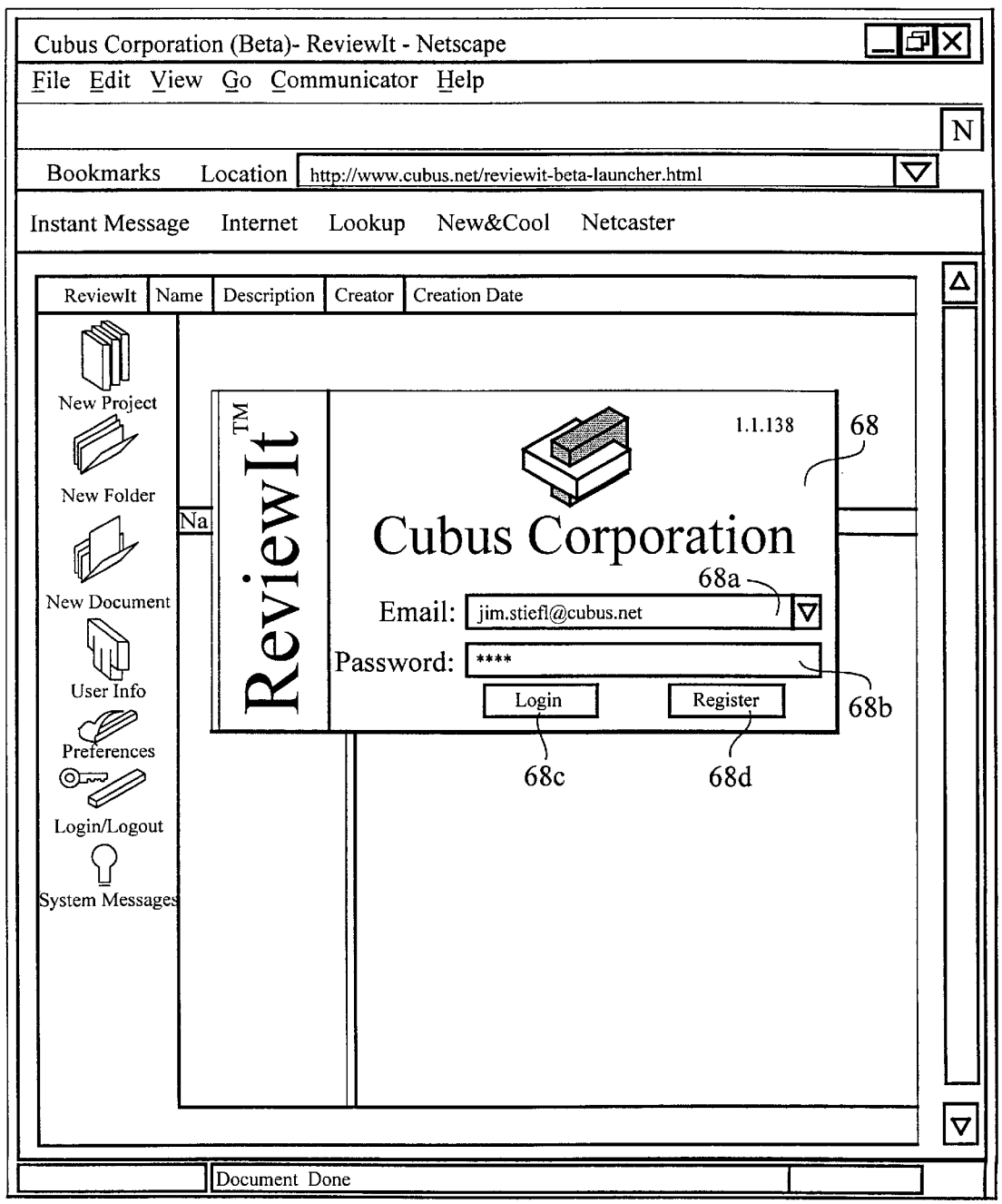
FIG. 5 is a plan view of a web page employed to allow users to either log-in or register to gain access to the present invention.

Log-in is achieved by activating hypertext link 64b which causes the client software to run and display a log-in screen 66, shown in FIG. 5. The log-in screen includes a dialog box 68 centered within a project view window 70. The dialog box 68 includes a plurality of data entry fields 68a and 68b. Also included thereon is a virtual button 68c which allows submission of the data once entered in fields 68a and 68b, as well as virtual button 68*d* which allows registering to use the present invention. One of the data entry fields 68*a* is to receive a user's e-mail address. The e-mail address is employed as a ReviewIt™ log-in identifier, discussed more fully below. To restrict access, a password data entry field is provided 68*b* in which any series of number or letters, up to 256 characters, may be entered. As is standard with most password security features, password data is never recited in the field 68*b*.

Figure 6:
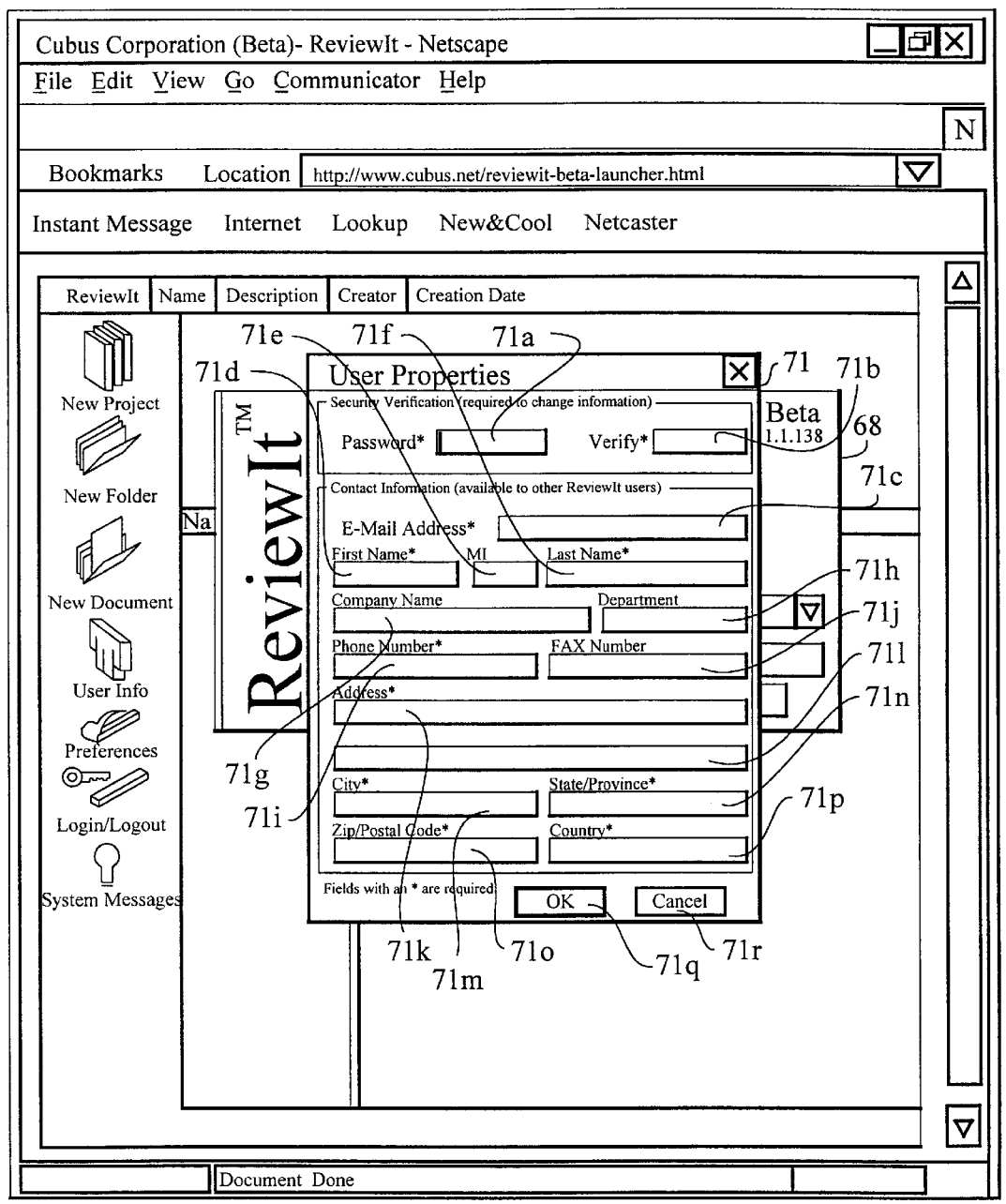
FIG. 6 is a plan view of a dialog box employed to allow a new user to register to gain access to the present invention.

If a user desires to register to use the present invention, virtual button 68*d* is activated and dialog box 71 is displayed so as to be in superimposition with dialog box 68, shown in FIG. 6. Dialog box 71 includes a plurality of data entry fields 71*a–p*. Also included thereon are virtual buttons 71*q* and 71*r* which allows submission of the data, once data has been entered in fields 71*a–p*, and cancellation of the registration, respectively. Once the registration data has been successfully submitted, dialog box 71 is removed, exposing dialog box 68, once again. Log-in is then achieved as discussed above.

Figure 7:
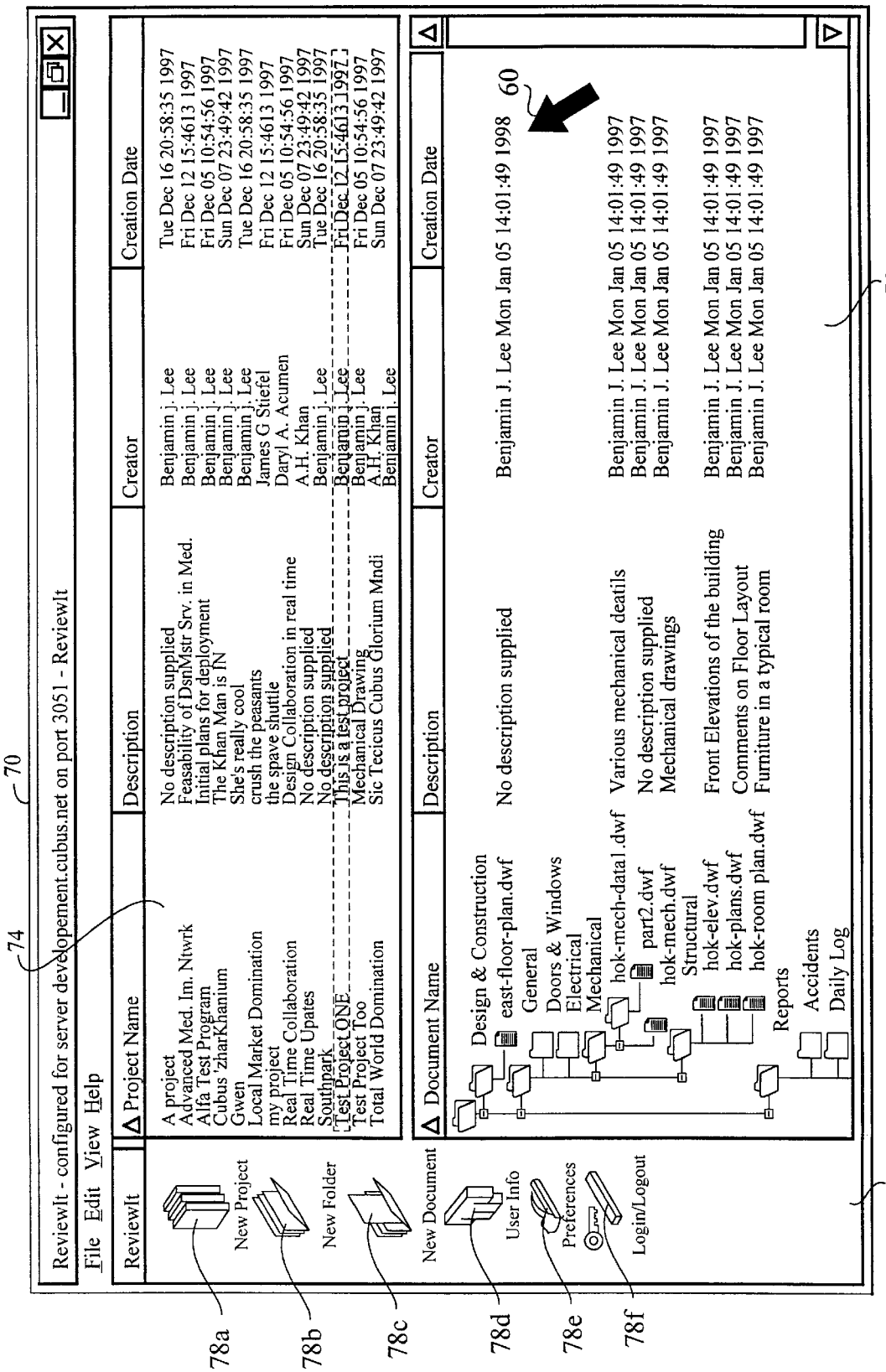
FIG. 7 is a plan view of a window upon which a list of projects having documents under development are recited in accordance with the present invention.

Upon acceptance of the log-in data, a TCP/IP connection to an additional server, which is the ReviewIt™ server 10*a*, is achieved and a project view window 70 is completely displayed, shown in FIG. 7. The project view window 70 is segmented into a plurality of regions: the menu bar 72; the project list 74; and the project file directory 76. Each of the regions may be adjusted to occupy areas of differing sizes on the display 12*a*. Typically, the project view window 70 is sized to fit the browser 54 window, with the project view menu bar 72 located on the left side of the display 12*a* and the project list 74 disposed atop of the project file directory 76 on the right-hand side.

The project list region 74 includes four columns of information identified as the following: project name; description, creator and creation date. The widths of the columns may be adjusted using the mouse 46 by initiating a cursor event proximate to the edge of the window as is well known in the computer graphics art. In addition, the files recited in the Project list may be sorted by initiating a cursor event proximate to one of the column headings, e.g., sorted by project listing by name, creator, etc. The project name recites the names of each project, and if the files associated therewith have been modified, this is indicated by having the project name have an appearance which differs from non-modified files. For example, a project with modified files may be displayed in a different color from projects with non-modified files. The description column recites a brief description of the purpose of the project name positioned adjacent thereto. The creator column identifies individuals who were primarily responsible for the creation of the project having a name in the column, and the creation date identifies the date that the creators originated the project, e.g., date and time. Usually, the information recited in the columns does not change for a project, once created.

The menu bar 72 contains a plurality of virtual buttons 78*a–78f*. Button 78*a*, for example, facilitates adding projects to the project list 74 and contains folders and documents, which may be organized by a creator and selectively shared with additional users. Similarly, virtual buttons 78*b* and 78*c* facilitate adding folders and documents, respectively. Documents are stored within folders and prioritized according to whatever constructs pertinent to a user. Documents are typically uploaded to the server. Virtual button 78*d* facilitates modifying user information, such as passwords and log-in identifier data. Virtual button 78*e* facilitates modifying preferences, such as modify access privileges of users for differing projects. Finally, button 78*f* allows logging into or out of the ReviewIt™ server 10*a*.

The project file region 76 recites the contents of each project listed in the project list region 74 in a threaded type of file hierarchy system. Each file and folder listing is divided into four columns having the headings discussed above with respect to the document list directory.

To access a particular file, a user highlights the requisite project with the cursor 60 by placing the same proximate to one row of text in the project list region 72. The selected column is then highlight and a cursor event is initiated by twice activating a button (not shown) on the mouse 46. This provides a list of folders and files associated with the aforementioned project, in the project file region 76. Specifically, folders have [+/−] signs adjacent thereto are indicated as having files associated therewith. The [+] indicates that the files are not displayed and the [−] sign indicates that the files are visible. To conceal visible files, a cursor event is initiated proximate to the [−] sign. Thereafter, a file is displayed by highlighting the same and initiating a cursor event. This produces a document view window 80, shown in FIG. 8.

Figure 8:
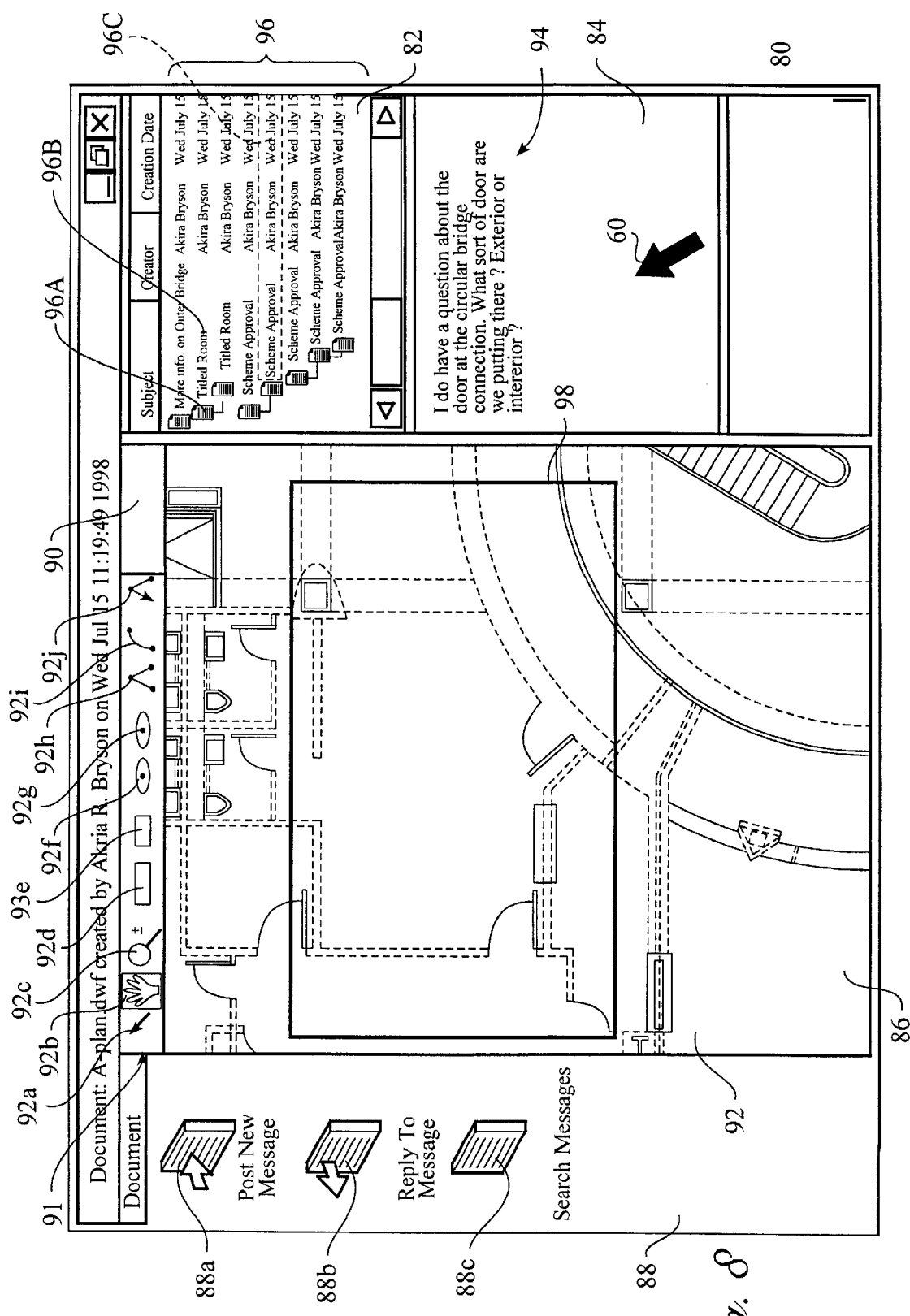
FIG. 8 is a plan view of a window in which a document file, a message file and a plurality of message headers are concurrently displayed.

Referring to both FIGS. 2 and 8, the document view window 80 provides an integrated view of a document under development. To that end, the document view window 80 is segmented into a plurality of regions 82, 84, 86, 88 and 90 on the display 48. Displayed in one of the regions 86 is a document file 92. Displayed in a second of the regions 84, is a message file 94 and a plurality of message headers 96 are displayed in a third region 82. Displayed in a fourth region 90 is a tool palette 91. Displayed a fifth region 88 is a plurality of virtual buttons 88*a*, 88*b* and 88*c*.

The document file 92 may be any file format, e.g., a vector-based file such as Drawing Web Format (DWF), Autodesk AutoCAD (DWG), Drawing Exchange Format (DXF), Simple Vector Format (SVF), Bentley Microstation (DGN, CEL), Adobe Illustrator (AI), Corel Draw (CMX), Microsoft Powerpoint (PPT), HPGL and HPGL/2. Additionally, the document file 92 may have a raster file format, such as Windows Bitmap (BMP), Compuserve GIF (GIF), Tagged Image File Format (TIFF), Joint Photographic Experts Group (JPEG or JPG), Device Independent Bitmap (DIB), Targa (TGA) or PCX, as well as a hybrid Formats, such as Hypertext Markup Language (HTML), Adobe Portable Document Format (PDF), Windows Metafile (WMF), Postscript (PS, EPS). If desired, document file may have a text format, such as, ASCII text (TXT), Rich Text Format (RTF), Microsoft Word (DOC) and the like. Similarly, the content of the message file 94 may include any of the aforementioned file formats, as well as a video stream, such as Motion Picture Experts Group (MPEG) Microsoft Video for Windows (AVI) Quicktime (MOV), an audio file or combination thereof. An advantage of this arrangement of information on the display 48 is that it provides an integrated document development system which allows simultaneously displaying a document being developed, detailed changes made thereto, as well as a brief history of the changes made during the development process. Further, an unedited version of the document being developed may be accessed at any stage during the development. The document file 92 includes data defining the document being developed, and the content of the message file 94 typically includes data corresponding to at least a portion of the viewable information associated with the document file 92. For example, a subportion of the viewable information of document file 92 is enclosed by a rectangle employing the tool palette 91, defining an annotation 98 which is discussed more fully below. The content of the message file 94 is related to the annotation 98. In the present example, the message file 94 recites "I do have a question about the door at the circular bridge connects . . . ", and the document file 92 shows a visual depiction of information associated with the content of the message file 94. In the present example, the document file 92 has viewable information corresponding to building plans, i.e. "blue print", and the area, identified by the document file 92, where a door would be located. In this fashion, both a visual presentation and a detailed textual description of a common idea is expressed.

To that end, each message header 96 provides a summary of the content of a message file 94. Typically, a plurality of message headers 96 are provided, each corresponding to a different message file 94 and having an icon 96a and a line of text 96b disposed adjacent thereto. With the plurality of message headers 96 being displayed in region 82, a brief history of the message files 94 associated with the document file 92 is provided. The message header 96 corresponding to the message file 94 being displayed has a background 96c which optically contrasts with the background associated with the remaining message headers 96, i.e., the message header 96 is "highlighted". As seen in FIG. 8, the highlighted message header 96 recites "Scheme Approval". The message file 94 associated therewith recites "I do have a question about the door at the circular bridge connects . . . " With this arrangement, the message file 94 and the message header 96 both provide a description of a subportion of the viewable information, typically the subportion corresponding to the annotation 98.

The tool palette 91 has one or more tool-defining regions, shown as 92a–92j and is employed to create the annotation 98. Each of the tool-defining region 92a–92i specifies a predetermined operation that modifies a subportion of the viewable information of the document file 92, defining an annotation 98. An example of an annotation 98 is shown as an oval, however, the annotation 98 can be of any shape desired and may include alphanumeric characters, depending upon the tool-defining regions of the tool palette 91, as well as the file format of the document file 92. For purposes of the discussion, the document file 92 will be discussed as being a vector-based file commonly associated with computer aided design programs and systems. Thus, part of the viewable information is defined by view parameters, such as magnification, rotation, layer, window coordinates. As a result, the tool palette 91 provides tool-defining regions which support, inter alia, operations associated with aforementioned view parameters. Examples of such tool defining regions are a pointer tool 92a employed to select areas of the document file 92 to be modified, such as by deletion.

A hand tool 92b may be employed to pan the viewable information associated with the document file 92 along any direction in the plane of the region 86. A zoom tool 92c may be employed to increase or decrease the resolution of the viewable information. A box tool 92d facilitates surrounding an area of the viewable information with a rectangle or other polyhedron, and a filled box tool 92e makes the viewable information within the area opaque. Other shapes may be provided to achieve the same results by providing an oval tool 92f and a filled oval tool 92g. Other shape tools may be user defined with an irregular object tool 92h. An arrow tool 92i allows pointing to a particular section of the viewable information, and an arc tool 92j is employed to create arcuate lines.

Figure 9:
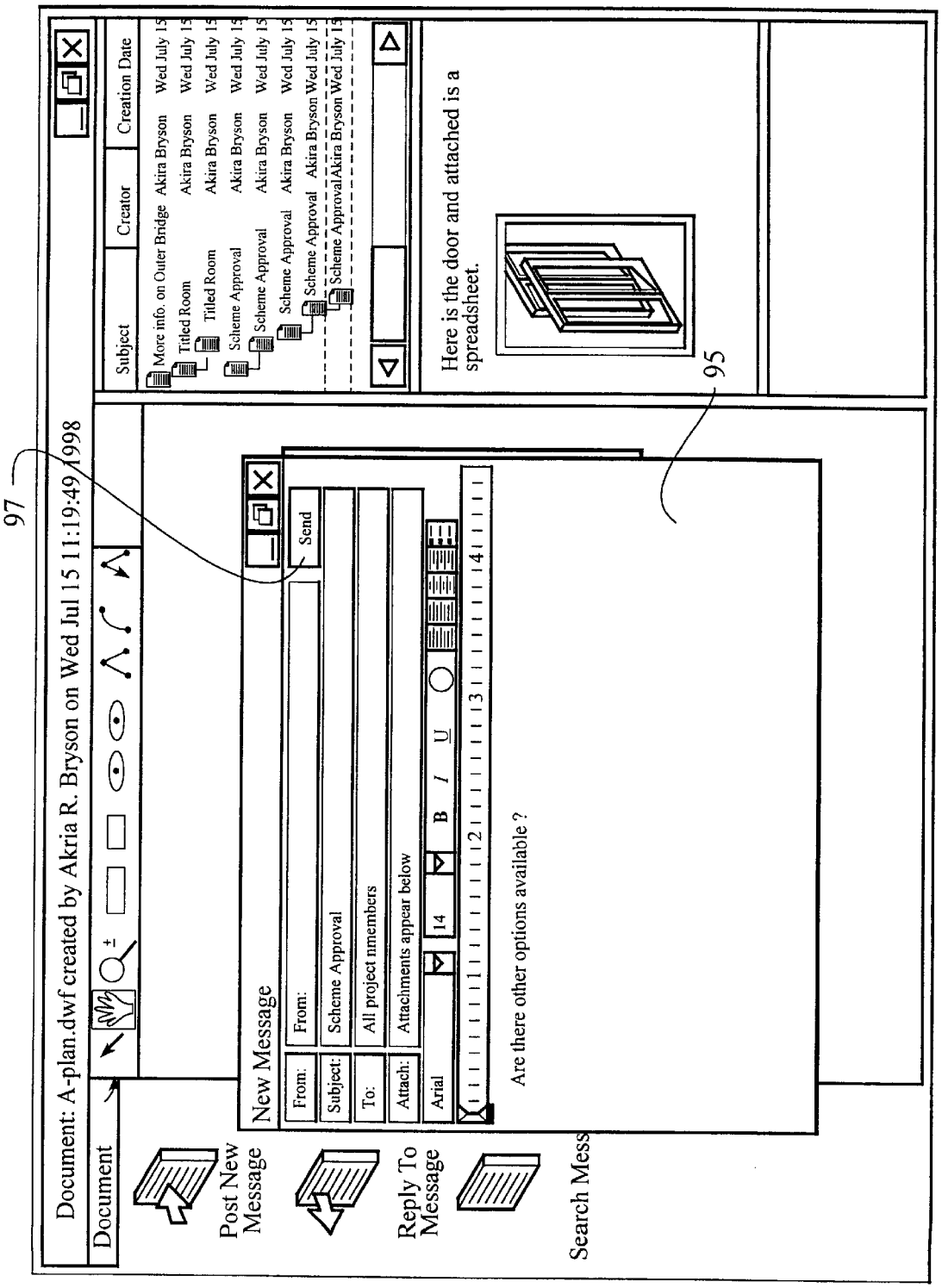
FIG. 9 is a plan view of a window employed to post a new message file.
Figure 10:
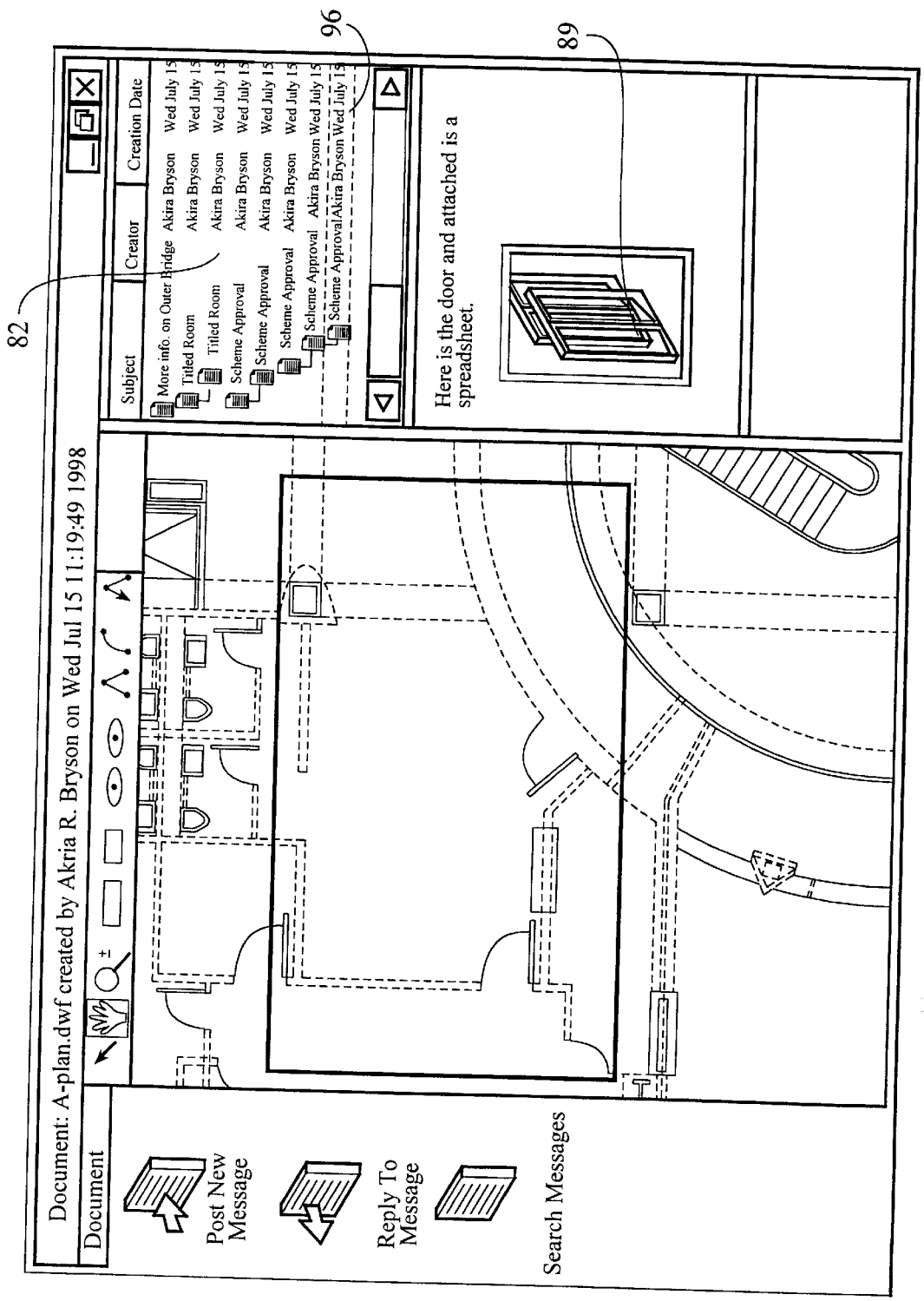
FIG. 10 is a plan view of the window shown in FIG. 8 with the same document file being displayed along with a different message file and in accordance with a set of view parameters which differ from those associated with the document file shown in FIG. 8.

Referring to both FIGS. 8 and 9, to post new message files or reply to an existing message file 94, the virtual buttons 88a and 88b are provided. Specifically, to post a new message file, virtual button 88a is activated by execution of a cursor event proximate thereto. This produces message file, in a window 95, having no content associated therewith, and the document file 92 corresponding thereto is in an original state. In this example, an original state is defined as being at minimum magnification, with no annotation 98 present therein. Thus, viewable information corresponding to a project is displayed in region 86. To produce the information associated with FIG. 8, a user would activate tool-region 92c and magnify the document file 92 to the desired resolution providing the detail necessary to clearly provide a visual depiction of the message file 94, generating modified view parameters that are associated with the viewable information. Locating a desired position in the document file 92 may be achieved by employing the hand tool, associated with tool-defining region 92b. To precisely delineate the area of the viewable information of the document file 92 being described, tool-region 92e is activated and the cursor 60 is placed on the region shown therein, producing annotation 98. After the portion of the viewable information of document file 92 has been located, the content of the message file 94 corresponding thereto is entered by placing the cursor 60 over the window 95 and initiating a cursor event. Text is entered using a standard QWERTY keyboard. Additionally, a graphics file or an audio file may be entered into the message file 94, such as graphics file 89, shown in FIG. 10.

After the desired content is present in the message file 94, the message is sent to the ReviewIt™ server 10a via initiating a cursor event occur proximate to virtual button 97. The message is saved on the ReviewIt™ server 10a with the view parameters. As the message header 96 corresponds to a newly created message file 94, the icon 96a of the same is located to the left side of the region 82. This produces a message header 96 in region 82 which corresponds to the newly created message file 94 in region 82. Upon retrieval, the modified viewable information associated with the document file 92 is displayed as it appeared in region 86 when the message file 94 was sent, i.e, the same magnification and identical annotation 98 in the area of the document file 92 displayed. This is referred to as context preservation and is discussed more fully below. However, all of the viewable information associated with the document file 92 is accessible. This allows a user to manipulate the viewable information associated therewith so as to display a completely different area of the document file 92 at a completely different magnification. Upon exiting and retrieving the same message file 94, the modified view parameters are restored along with the modified viewable information.

Accessing a particular message file 94 may be achieved employing either the message headers 96 or annotations 98 on a document file 92. For example, highlighting a particular message header 96 and initiating a cursor event displays a message file 94 with content summarized by the highlighted message header 96. Were a document file 92 displayed to have multiple annotations 98 present thereon, the cursor 60 may be positioned to highlight the desired annotation 98. Thereafter a cursor event would display the message file 94 associated with the annotation 98, referred to as graphical indexing. Moreover, a boolean search technique may be employed by highlighting virtual button 88c and initiating a cursor event. Thereafter a dialog window (not shown) would appear in the window 80 and provide an area to enter search terms, as is well known in the prior art.

Referring to FIGS. 8 and 9, to reply to an existing message, virtual button 88b is activated by initiating a cursor event proximate thereto. Thereafter, analogous steps are taken to post a reply as is necessitated to post a new message, except that the message header 96 corresponding to the reply message is positioned below the selected message to which a reply is being posted, offset from the left side of the region 82. In this fashion, not only do the plurality of message headers 96 provide a historical summary of the message files corresponding thereto, but they also describe the sequence of communications between users posting the same. The spatial position of each message header 96 is dependent upon a position of the communication, corresponding thereto, amongst the sequence communications. In this manner, the ReviewIt™ server 10 provides an entire history of the development of a document in a centralized location.

By centralizing the location of the document files, as discussed above, various techniques may be employed to further control and manage document development. For example, a creator of a project may be sent an e-mail each time a project is accessed by a user. Various information may be supplied to the creator, including the project and files accessed, the duration of the access, any message files 94 posted and the modifications, if any, recited therein. Further, the cost implication of modifications to a project may be modeled. In addition, authenticity and authorization of modifications to a project may be controlled by implementation of electronic signature techniques. This could be implemented to reduce cost overruns, particularly useful in public sector civil engineering contracts.

Referring again to FIG. 1 an important aspect of the present invention is to provide high-speed data communication between the client terminals 12 and the ReviewIt™ server 10a while providing the full flexibility of the integrated system. To that end, the ReviewIt™ server 10a bifurcates the data transmitted to a client terminal 12, concerning a document under development, into single and multiple server call data. The single server call data is transmitted to the client terminals 12 as soon as a project is opened. The multiple server call data is transmitted after an additional server call has been transmitted by the client terminals 12 after a project has been opened. Examples of single server call data are the message headers 96 and the annotations 98. Examples of multiple server call data is the message content and the view parameters. Upon initializing a server call, a client terminal 12 immediately receives the message header 96 and the annotations 98 associated with a document file 92. This provides the information necessary for a user to quickly view the history of message files 94 concerning a document file and determine which message is desired. Upon finding the requisite message header 96, a user initiates a cursor event, thereby taking advantage of message context preservation, as discussed above. Specifically, the contents of the message file 94 are displayed, as well as, the document file 92, with the document file 92 being displayed in accordance with the view parameters previously modified. Alternatively, a message file 94 could be displayed employing the graphical indexing technique discussed above. In this fashion, a user would place the cursor 60 on an annotation 98 desired and initiate a cursor event. This generates a server call over the network, retrieving the content information of the message file 94 associated therewith, along with the view parameters, if any.

Figure 11:
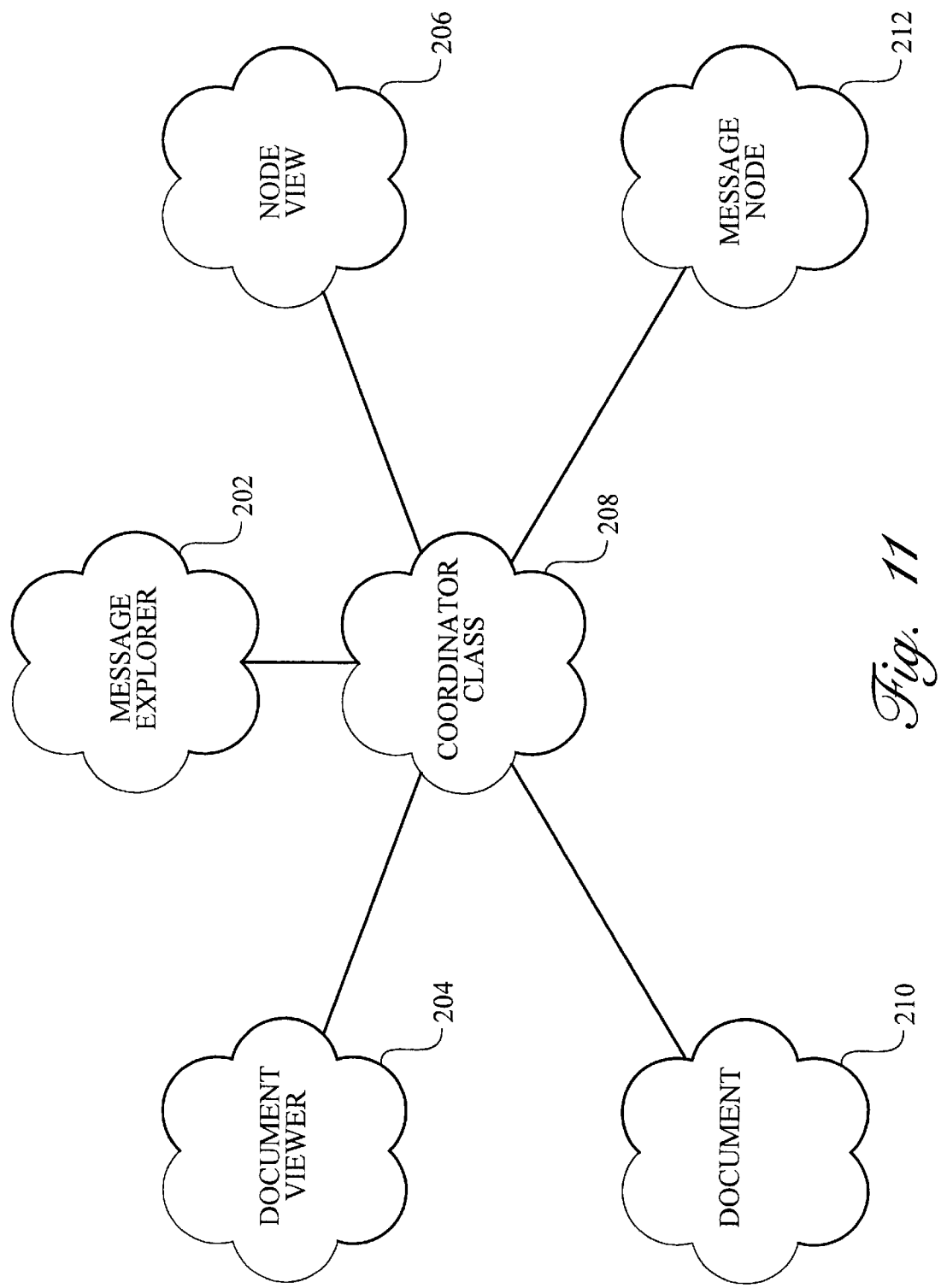
FIG. 11 is a simplified plan view of the major classes of objects associated with computer code employed to practice the present invention.

Referring to FIG. 11, to achieve the aforementioned data communication, it is preferred that the code employed to implement the present invention is object based, such as C++. The objects are divided into a plurality of classes. The classes include a message explorer class 202, a document viewer class 204, a node view class 206, a coordinator core class 208, a document class 210, and a message node class 212. Each of the objects in a class includes data and methods. The data and methods concerning the content of the message files 94 and the view parameters of the document file 92 associated therewith are encapsulated in objects of the message node class 212. Data and methods concerning the document file 92 are encapsulated in objects of the document class 210.

Figure 12:
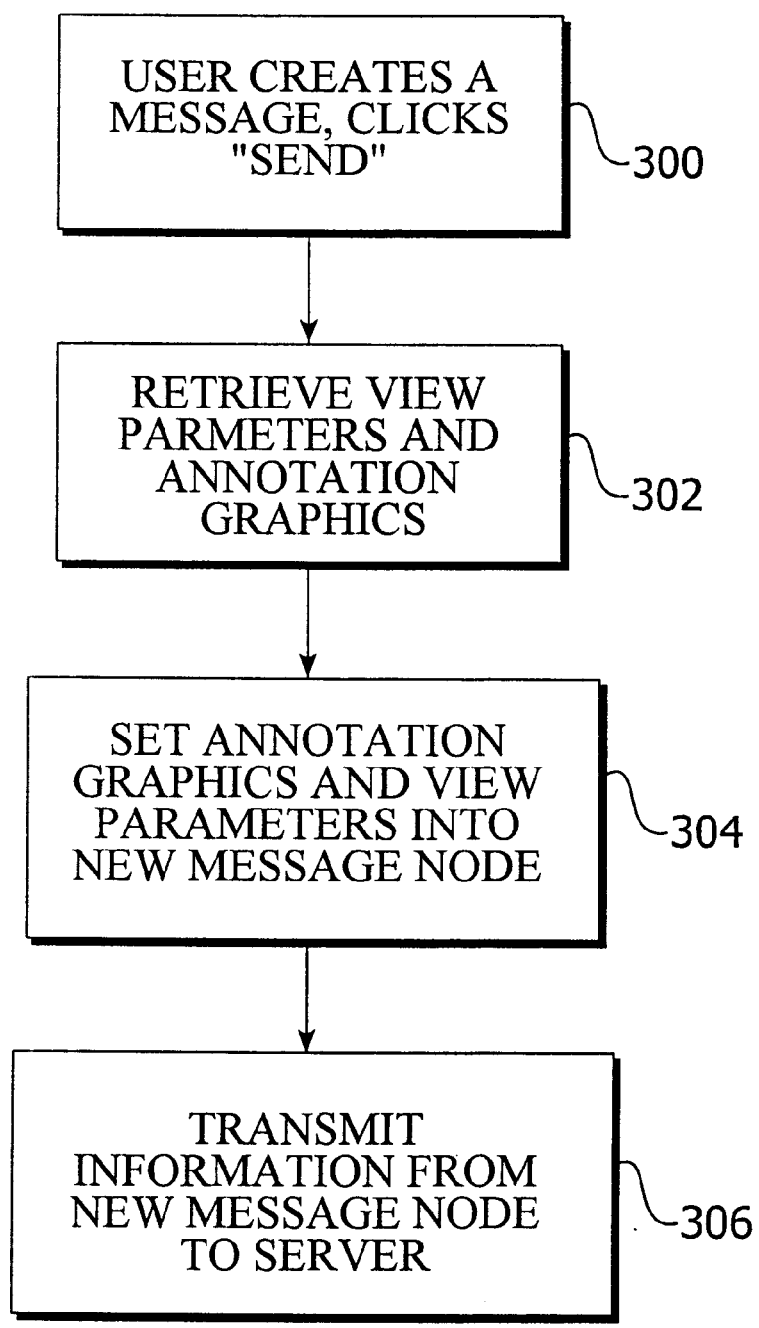
FIG. 12 is a flow diagram showing steps for storing a message file in accordance with the present invention.

Referring to both FIGS. 11 and 12, when creating a message at step 300, an object in the Message Node class 212 is generated, calling a member post method entitled CoreMessageNode::post(). This calls a member method of the Coordinator core class 208 entitled CoordinatorCore::post_messages(), which retrieves annotation data, document file data and the view parameters, at step 302. The aforementioned information is retrieved from the Document Viewer class of objects employing the member method of that class entitled the DocumentViewerCore::get_annotation(). The DocumentViewerCore::get_annotation() method retrieves data members of the Document class 210. Specifically, the DocumentViewerCore::get_annotation() method retrieves the serialized annotations employing the serialize_annotation_data() method, as well as the view parameters employing the CubusDocument::get_document_specific_data() method. The aforementioned data members are then associated with the MessageNode class 212, at step 304, allowing the same to be immediately available for subsequent requests. Thereafter, at step 306, the CoordinatorCore::post_message() method continues processing the data members associated with the Message Node class 212 which are then transmitted to the server 10 for long term storage and subsequent retrieval.

Figure 13:
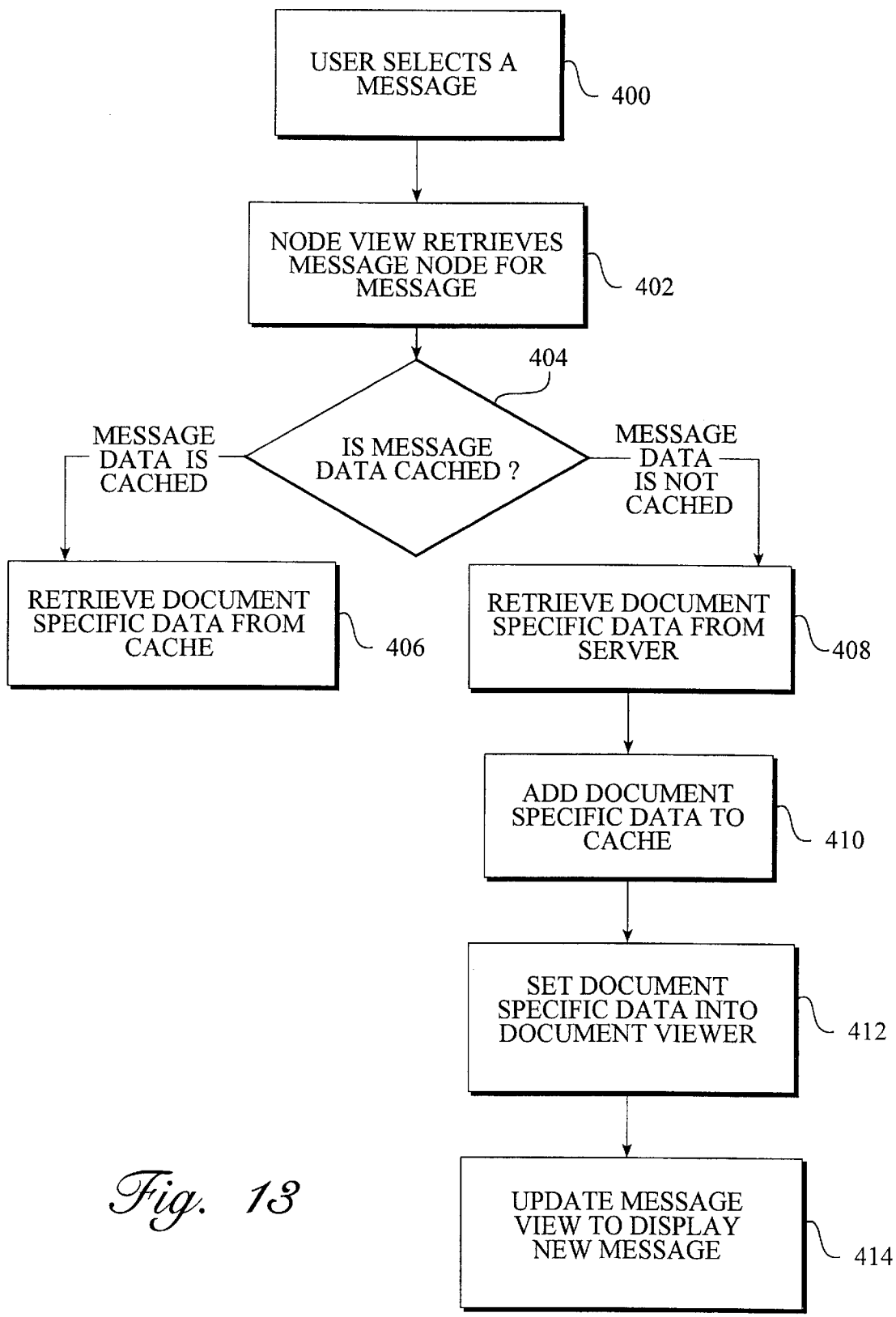
FIG. 13 is a flow diagram showing steps for retrieving a message file in accordance with the present invention.

Referring to both FIGS. 11 and 13, to retrieve a particular message, a user selects a message, at step 400, in the threaded message view by highlighting the same as discussed above. Control passes from the client terminal 12 to the ReviewIt™ server 10a by implementing the SftTreeNodeView::on_selchange() method associated with the objects of the Node View class 206. Employing the get_node() method member of the NodeView class of objects, the data members associated with the message file 94 are retrieved, at step 402. The data members of an object generated by the message being retrieved in the Message Node class 212 contains all the information to that particular message. This information includes, inter aria, view parameters and message content data. The resulting Message Node's select() method is then called.

The Coordinator Class' select_messages is called, passing the previously retrieved Message Node class 212 data members to determine if the desired message is already cached in the client terminal 12, at step 404. This is achieved by testing the values of the cache, in this case, specified addresses in RAM 98, to determine whether a null is present. If the values are not null, then the data is retrieved therefrom at step 406. If a null is present, a request is sent to the server to retrieve the desired information via the request_message() method of the Coordinator class 208, at step 408. The data is then transmitted to the client terminal 12 employing the process_mrsp() method of the Coordinator class 208, at step 410.

The message is implemented in the select_message() method of the Document class. This method retrieves the view parameters employing the get_field() method associated with the Message Node class, which is then passed to the current document file 92 via the document's set_document_specific_info() method associated with the Document class 210, at step 412.

The Message Node class 212 data members are then passed to the Message Explorer class in the update_ preview() method. The Message Explorer object get the message content from the data members associated with the Message Node class employing the node's get_field() method. Thereafter, the resulting buffer is passed to the set_formatted_text() method to display it, at step 414. The end result is that the document viewer changes its display to restore the view to the original author was looking at when the message was created.

Although the foregoing has been discussed with respect to a vector-list file, is should be understood that the document file 92 could be a text based file, such as a common wordprocessor file. In this fashion, view parameters associated therewith could include character attributes, e.g., italics, bold, underline and the like, as well as text and graphic boxes.

Furthermore, the above embodiment illustrates use of the present invention in a CAD environment. It should be understood that the embodiments of the present invention can also be applied to other situations in which collaboration is required. Examples of other situations in which the present invention may be applied include health care diagnoses and treatment, advertisement layout and design, movie production and the like. The scope of the invention should, therefore, be determined not with reference to the above description, but instead should be determined with reference to the appended claims along with their full scope of equivalents.

What is claimed is:

1. An integrated document development method employing a display, said method comprising:

segmenting said display into a plurality of regions;

displaying, in one of said regions, a subportion of viewable information associated with a document file;

displaying, in a second of said regions, a first message file, with said first message file providing information associated with said subportion;

displaying, in a third of said regions, a plurality of message headers, with each of said message headers providing a summary of content of a corresponding one of a plurality of message files; and varying said subportion of said viewable information by displaying, in said second of said regions, a second message file.

2. The method as recited in claim 1 further including a step of displaying a tool palette and a cursor, with said tool palette being positioned in a fourth region of said display, said tool palette having a tool-defining region disposed thereon, said tool-defining region specifying a predetermined operation which modifies a subportion of said viewable information, defining an annotation.

3. The method as recited in claim 1 wherein a subset of said plurality of message headers correspond to a sequence of data transmissions, with each message header of said subset being arranged within said second region so that a spatial position of each is dependent upon a position of the data transmission, corresponding thereto, amongst said sequence of data transmissions.

4. The method as recited in claim 1 wherein a message header corresponding to a message file displayed in said second of said regions has a background which optically contrasts with the background associated with the remaining message headers of said plurality of message headers.

5. The method as recited in claim 1 wherein said document file is a vector-based file.

6. The method as recited in claim 1 wherein said document file includes a raster file embedded therein.

7. The method as recited in claim 1 wherein said document file is a character-based file.

8. The method as recited in claim 1 wherein said message file includes a vector-based file embedded therein.

9. The method as recited in claim 1 wherein said message file includes a raster file embedded therein.

10. The method as recited in claim 1 wherein said message file includes a character-based file embedded therein.

11. The method as recited in claim 1 wherein said message file includes a video-stream.

12. The method as recited in claim 5 wherein said vector-based file comprises of a file having a format selected from the set consisting of Drawing Web Format (DWF), a Autodesk AutoCAD format (DWG), a Drawing Exchange Format (DXF), a Simple Vector Format (SVF), a Bentley Microstation format, a Adobe Illustrator format (AI), a Corel Draw format (CMX), a Microsoft Powerpoint format (PPT), an HPGL, and an HPCL/2 format.

13. The method as recited in claim 6 wherein said raster file comprises of a file having a format selected from the set consisting of a Windows Bitmap file (BMP), a Compuserve file (GIF), a Tagged Image File Format (TIFF), a Joint Photographic Experts Group file (JPEG), a Device Independent Bitmap file (DIB), a Targa file (TGA) and a PCX file.

14. The method as recited in claim 7 wherein said character-based file comprises of a file selected from a set consisting of an ASCII text file (TXT), a Rich Text Format file (RTF) and a Microsoft Word file (DOC).

15. The method as recited in claim 1 wherein said document file includes a Hypertext Markup Language file (HTML).

16. The method as recited in claim 1 wherein said document file includes an Adobe Portable Document Format (PDF).

17. The method as recited in claim 1 wherein said document file includes a Windows Metafile (WMF).

18. The method as recited in claim 1 wherein said document file includes a Postscript file.

19. The method as recited in claim 1 wherein said message file includes an audio file embedded therein.

20. The method as recited in claim 8 wherein said vector-based file comprises of a file having a format selected from the set consisting of Drawing Web Format (DWF), a Autodesk AutoCAD format (DWG), a Drawing Exchange Format (DXF), a Simple Vector Format (SVF), a Bentley Microstation format, a Adobe Illustrator format (AI), a Corel Draw format (CMX), a Microsoft Powerpoint format (PPT), an HPGL, and an HPCL/2 format.

21. The method as recited in claim 9 wherein said raster file comprises of a file having a format selected from the set consisting of a Windows Bitmap file (BMP), a Compuserve file (GIF), a Tagged Image File Format (TIFF), a joint Photographic Experts Group file (JPEG), a Device Independent Bitmap file (DIB), a Targa file (TGA) and a PCX file.

22. The method as recited in claim 10 wherein said character-based file comprises of a file selected from a set consisting of an ASCII text file (TXT), a Rich Text Format file (RTF) and a Microsoft Word file (DOC).

23. The method as recited in claim 1 wherein said message file includes a Hypertext Markup Language file (HTML).

24. The method as recited in claim 1 wherein said message file includes an Adobe Portable Document Format (PDF).

25. The method as recited in claim 1 wherein said message file includes a Windows Metafile (WMF).

26. The method as recited in claim 1 wherein said message file includes a Postscript file.

27. The method as recited in claim 11 wherein said video stream includes Motion Picture Experts Group information (MPEG).

28. The method as recited in claim 11 wherein said video stream includes Microsoft Video for Windows information (AVI).

29. The method as recited in claim 11 wherein said video stream includes Quicktime information (MOV).

30. An integrated document development method employing a display, said method comprising:

segmenting said display into a plurality of regions;

displaying, in one of said regions, a document file having viewable information associated therewith;

displaying, in a second of said regions, a message file;

displaying, in a third of said regions, a plurality of message headers, with a subset of said message headers providing a summary of content in said message file; and displaying a tool palette and a cursor, with said tool palette being positioned in a fourth region of said display, said tool palette having a tool-defining region disposed thereon, said tool-defining region specifying a predetermined operation which modifies a subportion of said viewable information, defining an annotation, with said content including data related to said annotation.

31. The method as recited in claim 30 wherein said tool palette includes a plurality of tool defining region each of which specifies a predetermined operation differing from the predetermined operation specified by the remaining tool defining regions.

32. The method as recited in claim 30 wherein a subportion of said plurality of message headers provide a summary of content of differing message files and further including a step of varying said annotation by displaying one of said differing message files.

33. The method as recited in claim 30 wherein a subgroup of said plurality of message headers corresponds to a sequence of data transmissions, with each message header of said subgroup being arranged within said second region so that a spatial position of each is dependent upon a position of the data transmission, corresponding thereto, amongst said sequence of data transmissions.

34. The method as recited in claim 33 wherein one of said headers of said subgroup corresponds to said message file and has a background which optically contrasts with the background associated with the remaining message headers of said plurality of message headers.

35. An integrated document development method employing a display, said method comprising:

segmenting said display into a plurality of regions;

displaying, in one of said regions, a document file having viewable information associated therewith;

displaying, in a second of said regions, a message file;

displaying, in a third of said regions, a plurality of message headers, with a subset of said message headers providing a summary of content in said message file and said message file providing a description of a subportion of said viewable information, with a subportion of said plurality of message headers provides a summary of content of differing message files and further including a step of varying said subportion of said viewable information by displaying one of said differing message files.

36. The method as recited in claim 35 further including a step of displaying a tool palette and a cursor, with said tool palette being positioned in a fourth region of said display, said tool palette having a tool-defining region disposed thereon, said tool-defining region specifying a predetermined operation which modifies a subportion of said viewable information, defining an annotation.

37. The method as recited in claim 36 wherein a subset of said plurality of message headers correspond to a sequence of data transmissions, with each message header of said subset being arranged within said second region so that a spatial position of each is dependent upon a position of the data transmission, corresponding thereto, amongst said sequence of data transmissions.

38. The method as recited in claim 37 wherein one of said plurality of headers corresponds to said message file said has a background which optically contrasts with the background associated with the remaining message headers of said plurality of message headers.

\* \* \* \* \*